A. J. STECKER.
LIQUID LEVEL INDICATOR.
APPLICATION FILED FEB. 15, 1909.
1,055,365.
Patented Mar. 11, 1913.
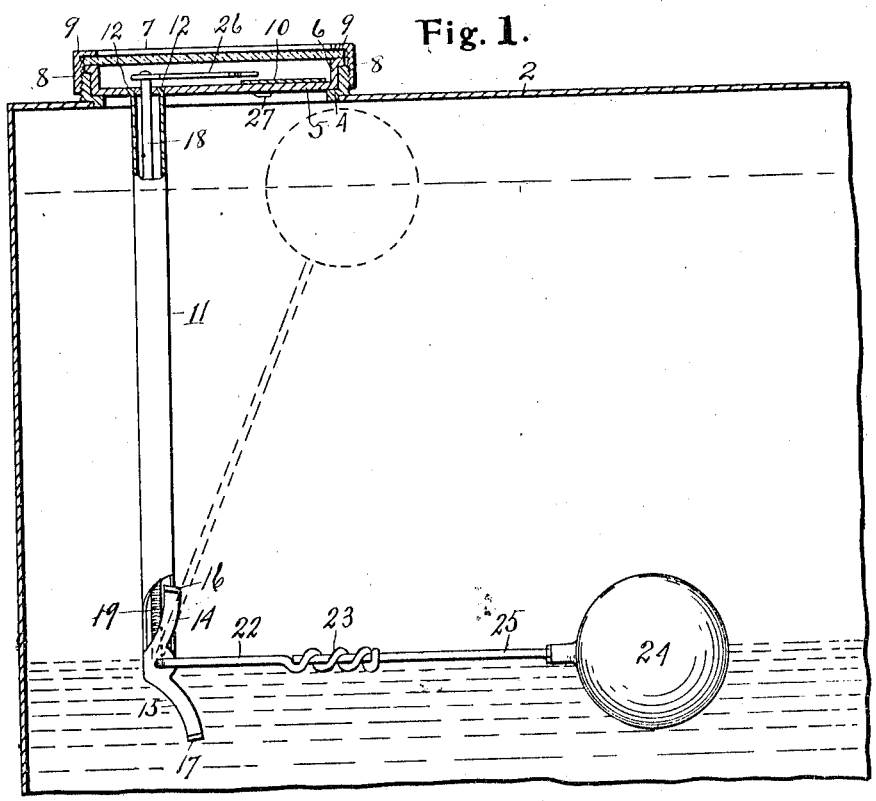
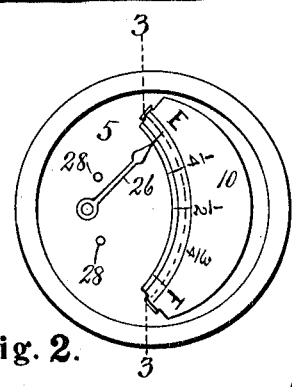
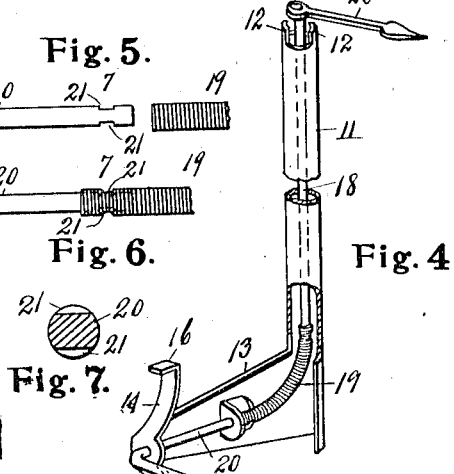
Witnesses
O. B. Baenziger.
J. G. Howlett.
Inventor
Alfred J. Stecker
By T. S. Wheeler & Co.
Attorneys

UNITED STATES PATENT OFFICE.

ALFRED J. STECKER, OF DETROIT, MICHIGAN, ASSIGNOR TO FRED WARDELL, OF DETROIT, MICHIGAN.

LIQUID-LEVEL INDICATOR.

1,055,365. Specification of Letters Patent. Patented Mar. 11, 1913.

Application filed February 15, 1909. Serial No. 477,843.

*To all whom it may concern:*

Be it known that I, ALFRED J. STECKER, a citizen of the United States, residing at Detroit, in the county of Wayne, State of Michigan, have invented certain new and useful Improvements in Liquid-Level Indicators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to tank gages, and especially to gages for indicating the level of the liquid contents of gasolene tanks.

The invention consists in the construction and arrangement of parts hereinafter more fully set forth and claimed.

The object of the invention is to provide an efficient gage of the character described, of comparatively simple and inexpensive construction, wherein the arrangement is such as to enable the liquid level of a tank in which the gage is placed, to be at all times determined, provision being made for actuating a hand to traverse a visible dial plate, the position of said hand indicating the level of the liquid within the tank.

The above object is attained by the device illustrated in the accompanying drawings, in which:—

Figure 1 is a view partly in section, showing my improved gage mounted in a tank, the greater portion of which is broken away. Fig. 2 is a plan view of the dial and indicating hand. Fig. 3 is a transverse section as on line 3—3 of Fig. 2. Fig. 4 is a fragmentary view in perspective, showing the vertical and horizontal shafts connected by a flexible section, through the medium of which the rotary or rocking movement of the horizontal shaft is transmitted to the vertical shaft to actuate the indicating hand. Fig. 5 is a view of one end of one of the shafts, and one end of the flexible shaft section, said parts being disjoined. Fig. 6 is a view of said parts connected. Fig. 7 is an enlarged transverse section, as on line 7—7 of Fig. 5.

Referring to the characters of reference, 1 designates a ring adapted to be secured in the top 2 of the tank and externally threaded, as shown at 3. Within said ring is an annular shoulder 4. Seated upon said shoulder is a saucer-shaped dial plate 5 having a vertical marginal flange 6 upon which is supported a glass disk 7. A collar 8 is screwed onto the threads 3 of said ring, and said collar is provided with a lateral flange 9 which engages the upper face of the glass disk 7, whereby when said collar is screwed tightly into place, all of said parts are held firmly together. The dial 10 is in the form of a crescent and is provided with suitable graduations thereon and the indicating letters F and E designating "full" and "empty."

A supporting tube 11 is secured to the dial plate to depend from the under side thereof by means of the tenons 12 formed on the upper end of said tube (see Fig. 4) which are fastened in receiving apertures in said plate. The lower portion of the supporting tube 11 is provided with a laterally extending bracket 13 having at the free end thereof the oppositely extending arms 14 and 15 carrying at their outer ends respectively the laterally extending stops 16 and 17.

Extending through the supporting tube 11 is a vertical shaft 18 whose upper end is journaled in the dial plate, and to the lower end of which is rigidly connected one end of the flexible shaft section 19. A horizontal shaft 20 is journaled in suitable bearings carried by the bracket 13, and to the inner end of said horizontal shaft is connected the other end of the flexible shaft section 19. The flexible shaft section describes a curved elbow and when joined at its ends to the horizontal and vertical shafts, affords in effect a continuous shaft, comprising a horizontal and a vertical section connected by a curved flexible section, enabling the motion of the shaft 20 to be imparted to the shaft 18, through the medium of the flexible section 19 connecting the ends of said shafts.

The flexible shaft section 19 is preferably in the form of a tightly wound coil of spring wire, and to secure the ends of said flexible section to the terminals of the horizontal and vertical shafts, said shafts are provided at their ends, which are connected by the flexible section, with depressions or flattened portions 21 in opposite sides of their peripheries, into which the strands of the coiled flexible section are depressed after the end of the flexible section shall have been slipped over the end of the shaft, as clearly shown in Fig. 6, thereby locking the ends of the flexible shaft to the end portions of the rigid shafts in a manner to cause all of said shafts to turn in unison.

Extending from the horizontal shaft 20 is a rigid arm 22, the outer end of which is formed into a spiral coil 23. A float 24 is provided with an arm 25 adapted to enter the spiral coil 23 and to fit snugly therein, but capable of longitudinal movement therethrough. By this means the combined length of the arms 22 and 25 may be regulated so as to increase or decrease the radius of travel of the float 24, according to the size of the tank in which the gage is located.

On the upper end of the vertical shaft is an indicating hand or pointer 26 adapted to sweep the face of the dial 10 and indicate by its position with respect to the graduations on said dial, the quantity of liquid within the tank. As the float 24 rises and falls in accordance with any change in the level of the liquid contents of the tank, the horizontal shaft 20 will be actuated and the movement thereof imparted to the vertical shaft through the flexible section 19, enabling the two shafts standing at right angles, to be actuated equally and in unison without any gear connection between them, making a simple and efficient gage. The projecting stops 16 and 17 upon the arms 14 and 15 are for the purpose of arresting the movement of the arm 22 as it is swung to the limit of its travel in opposite directions by the rise and fall of the float. The dial 10 is detachably mounted upon the dial plate 5 through the medium of the prongs 27 formed on the dial which pass through apertures in said plate, whereby the size of the dial may be changed according to the size of the tank and the increase or decrease in the travel of the indicating hand. Arresting pins 28 may be employed in the dial plate 5 to limit the travel of the hand 26.

Having thus fully set forth my invention, what I claim as new and desire to secure by Letters Patent, is:—

1. In a device for the purpose set forth, a vertical support, a horizontal bracket at the lower end of said support, a horizontal shaft journaled on said bracket, an arm extending at right angles from said shaft and adapted to move in the arc of a vertical circle, stops on said bracket for limiting the movement of said arm, a vertical shaft on said support, and a flexible elbow comprising a tightly wound spring connecting the adjacent ends of said shafts.

2. In a device for the purpose set forth, a vertical support, a horizontal bracket at the lower end of said support, vertical arms on said bracket having lateral projections at their ends, a horizontal shaft journaled on said bracket, an arm extending at right-angles from said shaft and adapted to move in the arc of a vertical circle and to engage one of said projections at the limit of its movement in either direction, a vertical shaft on said vertical support, and a flexible elbow comprising a tightly wound spring connecting the adjacent ends of said shaft.

In testimony whereof, I sign this specification in the presence of two witnesses.

ALFRED J. STECKER.

Witnesses:
O. B. BAENZIGER,
I. G. HOWLETT.

---

Copies of this patent may be obtained for five cents each, by addressing the "Commissioner of Patents, Washington, D. C."